(12) United States Patent
Biles et al.

(10) Patent No.: US 8,180,980 B2
(45) Date of Patent: May 15, 2012

(54) DEVICE EMULATION SUPPORT WITHIN A HOST DATA PROCESSING APPARATUS

(75) Inventors: Stewart David Biles, Little Thurlow (GB); David Hennah Mansell, Cambridge (GB); Richard Roy Grisenthwaite, Nr Royston (GB)

(73) Assignee: ARM Limited, Cambridge (GB)

( * ) Notice: Subject to any disclaimer, the term of this patent is extended or adjusted under 35 U.S.C. 154(b) by 424 days.

(21) Appl. No.: 12/453,806

(22) Filed: May 22, 2009

(65) Prior Publication Data

US 2010/0094613 A1    Apr. 15, 2010

(30) Foreign Application Priority Data

May 23, 2008  (GB) .................................. 0809492.2

(51) Int. Cl.
*G06F 12/00*  (2006.01)
(52) U.S. Cl. ........................ 711/154; 711/162
(58) Field of Classification Search .................. 711/154, 711/162
See application file for complete search history.

(56) References Cited

U.S. PATENT DOCUMENTS

| | | | |
|---|---|---|---|
| 6,081,837 A | 6/2000 | Miller | |
| 7,356,456 B1 | 4/2008 | Wheeler | |
| 7,886,115 B2 * | 2/2011 | Sanvido et al. | ............... 711/154 |
| 2002/0004897 A1 | 1/2002 | Kao et al. | |
| 2003/0051104 A1 * | 3/2003 | Riedel | ............... 711/154 |
| 2004/0133764 A1 | 7/2004 | O'Connor et al. | |
| 2004/0181641 A1 * | 9/2004 | Nguyen et al. | ............... 711/162 |
| 2005/0076186 A1 | 4/2005 | Traut | |
| 2005/0246453 A1 | 11/2005 | Erlingsson et al. | |
| 2006/0168485 A1 | 7/2006 | Jusufovic et al. | |
| 2006/0259292 A1 | 11/2006 | Solomon et al. | |
| 2008/0155208 A1 * | 6/2008 | Hiltgen et al. | ............... 711/154 |

FOREIGN PATENT DOCUMENTS

| | | |
|---|---|---|
| EP | 0 817 029 | 8/2002 |
| WO | WO 2006/125219 | 11/2006 |
| WO | WO 2008/113007 | 9/2008 |

OTHER PUBLICATIONS

International Search Report and Written Opinion of the International Searching Authority dated Jun. 23, 2009 for PCT/GB2009/000771.
Search Report for GB 0809492.2 dated Sep. 16, 2008.
Search Report for GB 0821520.4 dated Mar. 23, 2009.

* cited by examiner

*Primary Examiner* — Michael Tran
(74) *Attorney, Agent, or Firm* — Nixon & Vanderhye, P.C.

(57) ABSTRACT

A data processing apparatus 12 is provided with a memory management unit 24 which triggers memory aborts. When a memory abort occurs, data characterizing the memory abort is written to a fault status register 28 (memory-abort register). The data characterizing the memory abort includes data identifying a register number associated with the memory access which gave rise to the memory abort. This register identifying data is used to emulate the action of the memory access instruction without having to read the program instruction lead to the memory abort. This is useful in providing virtualization support for a virtual data processing apparatus 2.

22 Claims, 3 Drawing Sheets

DEVICE EMULATION SUPPORT WITHIN A HOST DATA PROCESSING APPARATUS

BACKGROUND OF THE INVENTION

This application claims priority to British Patent Application No. 0809492.2 filed May 23, 2008, the entire contents of which is hereby incorporated by reference.

1. Field of the Invention

This invention relates to data processing systems. More particularly, this invention relates to data processing systems supporting virtualisation of a data processing apparatus.

2. Description of the Prior Art

It is known to provide host data processing systems which support the virtualisation of a data processing system. The scale of the differences between the host data processing system and the virtual data processing system can vary considerably. In some examples the virtual data processing system may be a slightly different version or implementation of a data processing apparatus having the same basic processor architecture as the host data processing apparatus. In another example, the virtual data processing apparatus may be completely different from the host data processing apparatus, e.g. a stack based Java virtual machine emulated by a RISC or CISC host data processing apparatus.

Within this field of virtualisation, it is often necessary to support virtual devices to give the illusion of a real hardware device to a guest operating system or program. These virtual devices are really provided by hypervisor software. A convenient way to support devices (both real and virtual) is that they are memory mapped and accesses to the devices take the form of loads or stores to the memory mapped addresses. When supporting virtual devices of the virtual data processing apparatus it is necessary to route accesses to virtual devices at these memory mapped addresses to the hypervisor software for handling. A known technique is to trap accesses to these memory locations by setting the corresponding memory region containing the memory mapped virtual devices to "Invalid" or "No access" and to arrange for the resulting exceptions to be routed to the hypervisor program.

A problem with this approach is the need to decode the instruction which was seeking to access the virtual device in order to emulate that access. A memory management unit (MMU) that will typically trigger the exception will also normally provide (or trigger the provision of) the address and read/write information associated with the access which is subject to the exception. Within a real environment this is normally sufficient to provide for efficient processing of the exception associated with the memory access.

SUMMARY OF THE INVENTION

Viewed from one aspect the present invention provides a method of supporting virtualisation of a virtual data processing apparatus with a host data processing apparatus, said method comprising the steps of:

executing a stream of program instructions with said host data processing apparatus to emulate processing by said virtual data processing apparatus;

detecting with detection circuitry an attempted execution of a memory accessing instruction seeking to perform a memory access operation upon a memory address corresponding to a memory mapped device of said virtual data processing apparatus;

writing with memory-abort circuitry to a memory-abort register memory-abort data characterising said memory access operation, said memory-abort data including data indicative of one or more registers accessed with said memory access operation; and triggering a memory-abort exception by execution of memory-abort handling program instructions by said host data processing apparatus to:

(i) read said memory-abort data from said memory-abort register;

(ii) emulate said memory access operation using said memory-abort data including said data indicative of one or more registers accessed with said memory access operation; and (iii) return to execution of said stream of program instructions.

The present technique recognises that when supporting virtualisation of a virtual data processing apparatus additional information concerning the memory access giving rise to the abort is necessary in order that the memory access can be emulated and that the obtaining of this additional information is disadvantageously slow. In particular, with known mechanisms the instruction giving rise to the memory abort needs to be identified and decoded to identify which CPU register is being loaded or stored in order that the emulation can proceed. This identification typically has many time consuming steps. Firstly, the instruction itself needs to be located; the address of the instruction provided when the abort occurs is often a virtual address in the guest operating system address space, which must be translated (normally via two or three translation steps) into a virtual address in the hypervisor address space which can then be read. Once the address of the aborting instruction has been determined, the instruction can be read. On a system with separate data and instruction caches (Harvard), this will usually cause a data miss and require many cycles for the data miss to be satisfied. The instruction then needs to be decoded. On many data processing apparatuses the instructions can access memory in a variety of different ways and there can be a considerable degree of complexity associated with decoding the instruction which has been received in order to identify the source/destination register and other characteristics of the memory access such that emulation can proceed.

The present technique both recognises and overcomes these difficulties in a hardware efficient manner. In a majority of cases the information needed for emulation of the access to the virtual device is an identification of one of more registers accessed with the memory access operation (whether they be source registers or destination registers) and the present technique extends the memory-abort circuitry to write this data into a memory-abort register. In practice, this register identifying data will normally already be present as it is needed for the normal operation of the memory access instruction and the additional mechanism required marshals this information toward a memory-abort register where it is stored upon the occurrence of the access to the memory mapped device of the virtual data processing apparatus. Abort handling program instructions can then directly read this register identifying information from the memory-abort register and use it to emulate the memory access operation at relatively high speed and without requiring the reading of the instruction which gave rise to that memory access in order that the register(s) can be identified. The technique thus provides hardware support for the virtualisation of a virtual data processing apparatus and a technique of using this hardware support to render the virtualisation of virtual devices more efficient.

It will be appreciated that the memory abort data can contain additional information beyond the data indicative of one or more registers accessed with the memory access operation. The data indicative of the one or more registers will allow most common case virtual device accesses to be readily supported and extension of the data stored within the memory-abort register will extend the types of accesses supported. The memory-abort data can be extended to include data indicative of a size of a data word subject to the memory access operation, data concerning whether or not the operation is a read operation or a write operation, data indicative of a source register or a destination register, data indicative of whether the data word is subject to sign extension as part of the memory access and data indicative of an instruction size of the memory accessing instruction.

The memory-abort data can additionally, in some embodiments, include validity data indicative of whether or not the memory-abort data is valid for the memory access instruction that triggered the memory abort. If the memory-abort data is not valid, then the memory-abort handling program instructions can determine this from the validity data and revert to reading the memory access instruction which gave rise to the memory-abort from the memory and determining memory accessing instruction parameters directly from the instruction so read. In this way a hardware designer can choose which instructions are simple enough to provide the syndrome data for, and those which are more complex and are not worth the hardware overhead to add support for in hardware.

Some memory accessing instructions utilise a base register storing an address value indicative of a memory address to be accessed and the instruction specifies an update that is to be performed upon that value associated with execution of the memory access instruction (e.g. pre or post indexing). The validity data can be used in conjunction with such instructions to indicate that the data characterising the memory access is not valid for such instructions which update a base register value and in these circumstances the instruction itself can be read from memory and decoded in order to determine the nature of the updating to be performed.

Another class of instruction for which the validity data can be used to indicate that the data characterising the memory access is not valid are load/store multiple instructions such as those provided by ARM processors. It is expected that these types of instruction would rarely be used to access devices, and as such the considerable hardware overhead needed to provide a syndrome register for them would not yield sufficient advantage to be justified. The valid data can be used to indicate that data characterising memory accesses of this type is not validly provided.

In alternative embodiments, an update register can be provided and can be written with update data characterising an update to be performed upon an address value stored within a base register in association with execution of a memory access instruction which gives rise to a memory-abort. This update register can be read by the memory-abort handling program instructions and used to perform a required update upon an address value stored within a base register as part of the emulation of the access to the virtual device.

Whilst virtualisation can be supported in a variety of different ways, the present technique is well suited to embodiments in which the stream of program instructions which are executed, and which include the memory access instructions which can give rise the memory-abort, are under control of a guest operating system with the execution of that guest operating system by the virtual data processing apparatus itself being emulated by a host data processing apparatus under control of a hypervisor program. This layered form of virtualisation will be familiar to those in this field and is of a type which suffers from the problem of slow virtual device emulation which is addressed with the present techniques.

The detection circuitry which serves to detect a memory access to a memory mapped device of the virtual data processing apparatus can take the form of a memory management unit using page table data to control accesses to memory addresses within a memory. Such memory management units are typically provided for other reasons and can be reused to provide the trapping of memory accesses to virtual memory mapped devices. The page table data used by the memory mapped device can be programmed with values that trigger an abort when a memory accessing instruction seeks to perform a memory access operation to a virtual memory mapped device.

Viewed from another aspect the present invention provides apparatus for processing data providing support for virtualisation of a virtual data processing apparatus, said apparatus for processing data comprising:

detection circuitry responsive to an attempted execution of a memory accessing instruction seeking to perform a memory access operation upon a memory address corresponding to a memory mapped device of said virtual data processing apparatus to trigger a memory abort; and memory-abort circuitry responsive to said memory abort to write to a memory-abort register memory-abort data characterising said memory access operation, said memory-abort data including data indicative of one or more registers accessed with said memory access operation.

Viewed from a further aspect the present invention provides apparatus for processing data providing support for virtualisation of a virtual data processing apparatus, said apparatus for processing data comprising:

detection means responsive to an attempted execution of a memory accessing instruction seeking to perform a memory access operation upon a memory address corresponding to a memory mapped device of said virtual data processing apparatus for triggering a memory abort; and memory-abort means responsive to said memory abort for writing to a memory-abort register memory-abort data characterising said memory access operation, said memory-abort data including data indicative of one or more registers accessed with said memory access operation.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
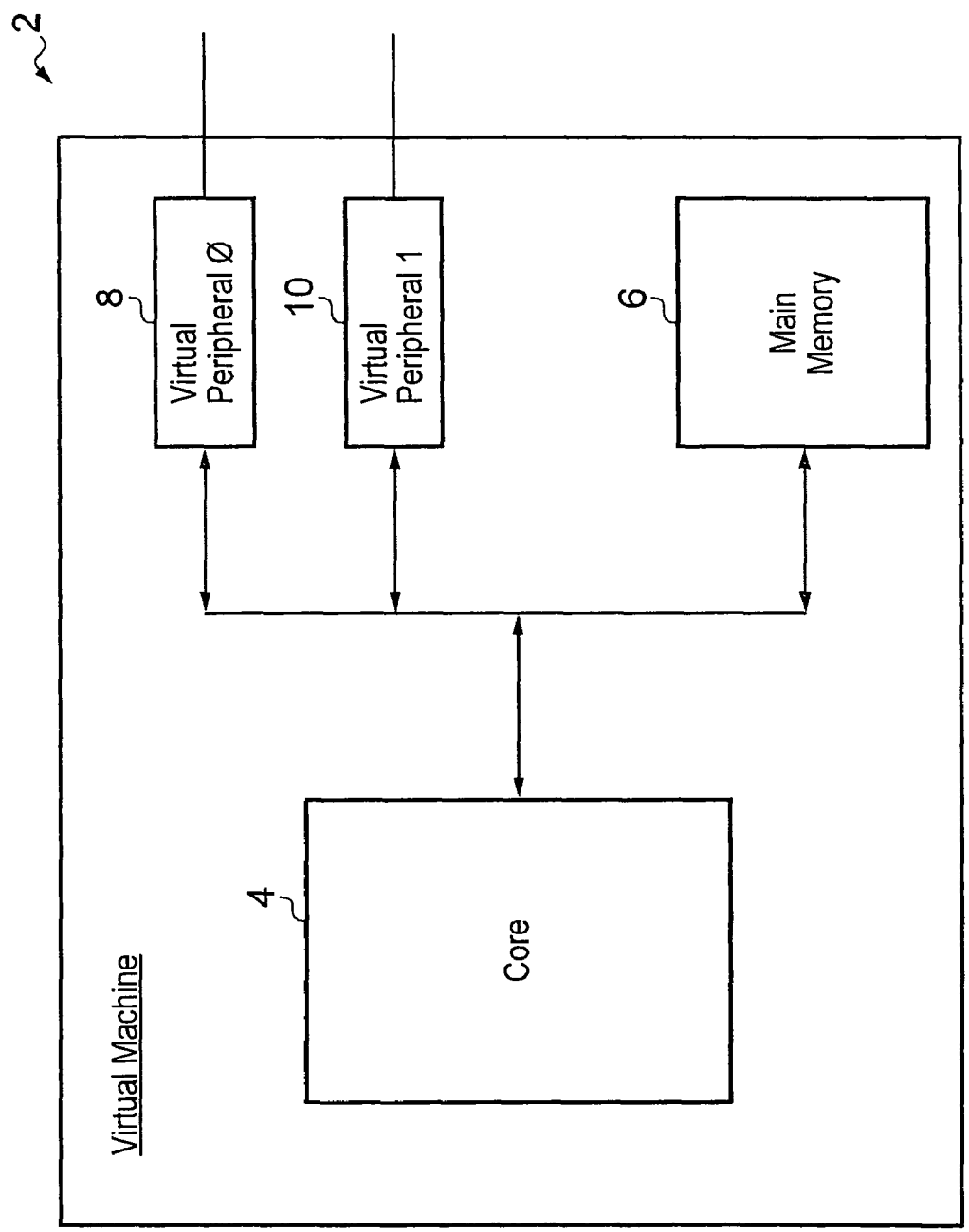
FIG. 1 schematically illustrates a virtual data processing apparatus including virtual memory-mapped devices.

FIG. 1 illustrates a virtual data processing apparatus 2, which can be considered to provide a virtual core 4 executing a stream of program instructions stored within a memory 6. These instructions within the memory 6 are instructions native to the virtual data processing apparatus 2 and will execute under control of a guest operating system (the execution of which is also emulated). The virtual data processing apparatus 2 includes virtual memory-mapped devices 8, 10, which are typically used to provide interfaces with devices attached to the virtual data processing apparatus 2. The virtual memory-mapped devices could be input/output ports, devices such as DMA engines and the like.

It is known within the field of virtualisation to support such memory-mapped devices 8, 10 by trapping memory accesses to the associated memory addresses and then emulating these memory accesses. Such operation normally requires the reading of the memory accessing program instruction that was being executed by the data processing apparatus 2 in order to identify sufficient information from that program instruction that the emulation can be accurately performed. This reading and decoding of the program instruction can be a slow and inefficient process significantly reducing the speed of the virtualised operation.

Figure 2:
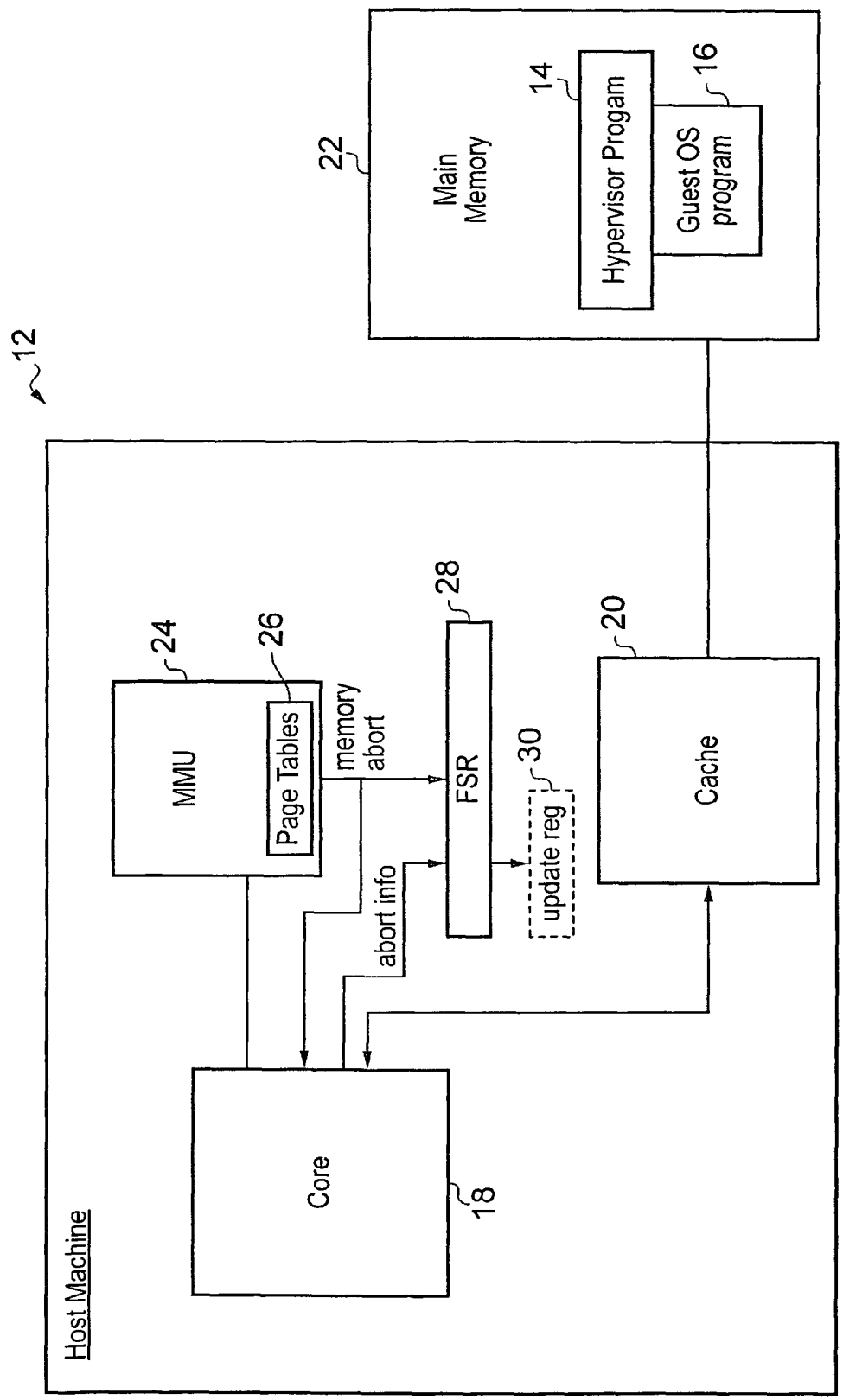
FIG. 2 schematically illustrates a host data processing apparatus including hardware mechanisms for supporting virtualisation.

FIG. 2 schematically illustrates a host data processing apparatus 12 which executes a hypervisor program 14, that itself emulates (or at least supports) execution of a guest operating system program 16 and guest program instructions which give rise to the memory accesses discussed in relation to FIG. 1. The architecture of the host data processing apparatus 12 may be similar to that of the virtual data processing apparatus 2 (in which case the virtualisation support will tend to be quick and efficient) or alternatively the virtual data processing apparatus 2 may have a very different architecture (in which case the virtualisation support needs to be more extensive and will tend to be slower and less efficient).

The host data processing apparatus 12 includes a processor core 18 for executing program instructions. A cache memory 20 (which could be unified or Harvard) is provided to store local copies of data and instructions from within a main memory 22 in a conventional manner. A memory management unit 24 responsive to page table data 26 monitors memory access operations performed by the processor core 18 to identify any which should give rise to memory aborts. The page table data 26 is programmed to mark as "Invalid" or "No access" memory address regions corresponding to the virtual memory-mapped devices 8, 10 within the memory address space of the virtual data processing apparatus 2 when emulation of that data processing apparatus 2 is being performed. Thus, the memory management unit 24 acts as detection circuitry serving to detect memory access operations to memory addresses corresponding to memory mapped devices of the virtual data processing apparatus that arise during execution of a stream of program instructions by the processor core 18 that emulate processing performed by the virtual data processing apparatus. The memory abort signal generated by the memory management unit 24 is supplied to a fault status register (memory-abort register) 28 which is responsive thereto to store abort information supplied to the fault status register 28 by the processor core 18. This abort information includes a variety of different pieces of information characterising the memory access operation which gave rise to the memory abort. The memory abort also triggers processing of an interrupt service routine which serves as memory-abort handling program instructions that read the fault status register 28 and then serve to emulate the memory access operation being performed to the virtual memory-mapped device. The memory-abort data written into the fault status register 28 includes the core register number(s) (e.g. one or more of $R_0$ to $R_{15}$ for an ARM architecture core) associated with the memory access giving rise to the abort. The memory access could be a read operation or a write operation and accordingly the register number may be a destination register number or a source register number.

Figure 3:
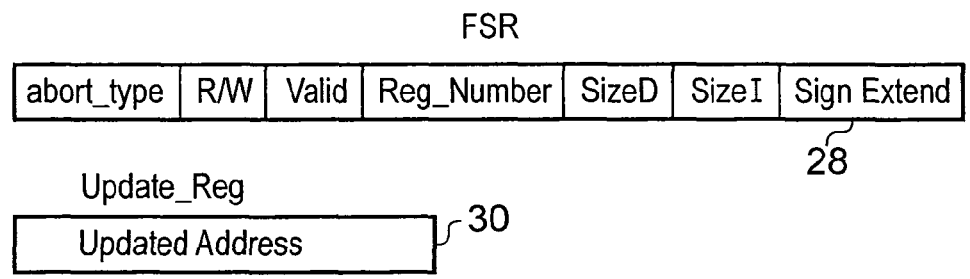
FIG. 3 schematically illustrates example contents of a memory-abort register and an update register which can be used to provide data characterising a memory access operation giving rise to a memory abort.

FIG. 3 schematically illustrates memory-abort data which may be written to the fault status register 28. This memory-abort data includes data identifying the abort type, a flag indicating whether the memory access was a read operation or a write operation, a flag indicating whether or not the memory-abort data should be considered valid by the memory-abort handling program instructions, data identifying the register number of the register associated with the memory access, data identifying the data access size associated with the memory access, data identifying an instruction size of the memory access instruction that is subject to the abort, and data identifying whether or not the data was to be sign extended. It will be appreciated that different types of memory-abort data may additionally or alternatively be provided. Also illustrated in FIG. 3 is an update register 30 which may optionally be provided in some embodiments.

As will be appreciated by those in this technical field, some memory access instructions utilise a base register for storing an address value from which the memory address of the memory access is derived. The value stored within the base register may also be updated as part of the memory access operation. As an example, within the ARM architecture, pre and post indexing memory accessing instructions are supported in which an increment to a memory address value is applied either before or after the memory accessing program instruction concerned is executed. When such a memory access instruction aborts and is to be emulated, it is important that the side-effect upon the base register value is also reproduced by the emulation. Whilst such side-effects which update a base register value are not common within instructions which access virtual memory-mapped devices, they nevertheless do occur and accordingly need be supported. One way is that a valid flag can be supplied within the fault status register 28 and if this is not set to indicate that the memory-abort data is valid, then the program instruction which gave rise to the memory-abort can be read and the side-effect which updates the base register value can be determined from a decoding of that program instruction. The valid flag within the fault status register 28 would not be set by the processor core 18 for instructions where a side-effect upon the base register value was present when an abort was triggered on such an instruction. Another example of instructions for which the valid flag is not set is load/store multiple instruction. The valid flag would be set for instructions in respect of which the memory-abort data is valid. As an alternative, an update register 30 may be provided into which data identifying any update needing to be performed upon a base register value may be written upon occurrence of the memory-abort. This update data can include an identification (e.g. register number) of the base register storing the base address value as well as data indicating the new value to be stored therein, or the change to be applied thereto. It will be appreciated that the provision of the update register 30 is optional and the use of the valid flag will allow a large majority of memory-aborts which arise during virtualisation support to be handled using valid data within the memory-abort register (FSR 28) with only rare cases being invalid.

The approach of allowing each particular implementation to decide which instructions to provide memory-abort data for, and which to just set the valid flag to zero for, allows each implementation to pick an appropriate set of instructions for that particular implementation—and the software will automatically be adjusted as well (i.e. it will only look up the instruction when the hardware doesn't provide the data). This is a considerable advantage compared to the alternative of specifying the subset of instructions for which the data must be provided in the architecture and requiring all implementations to provide the data in those cases.

Figure 4:
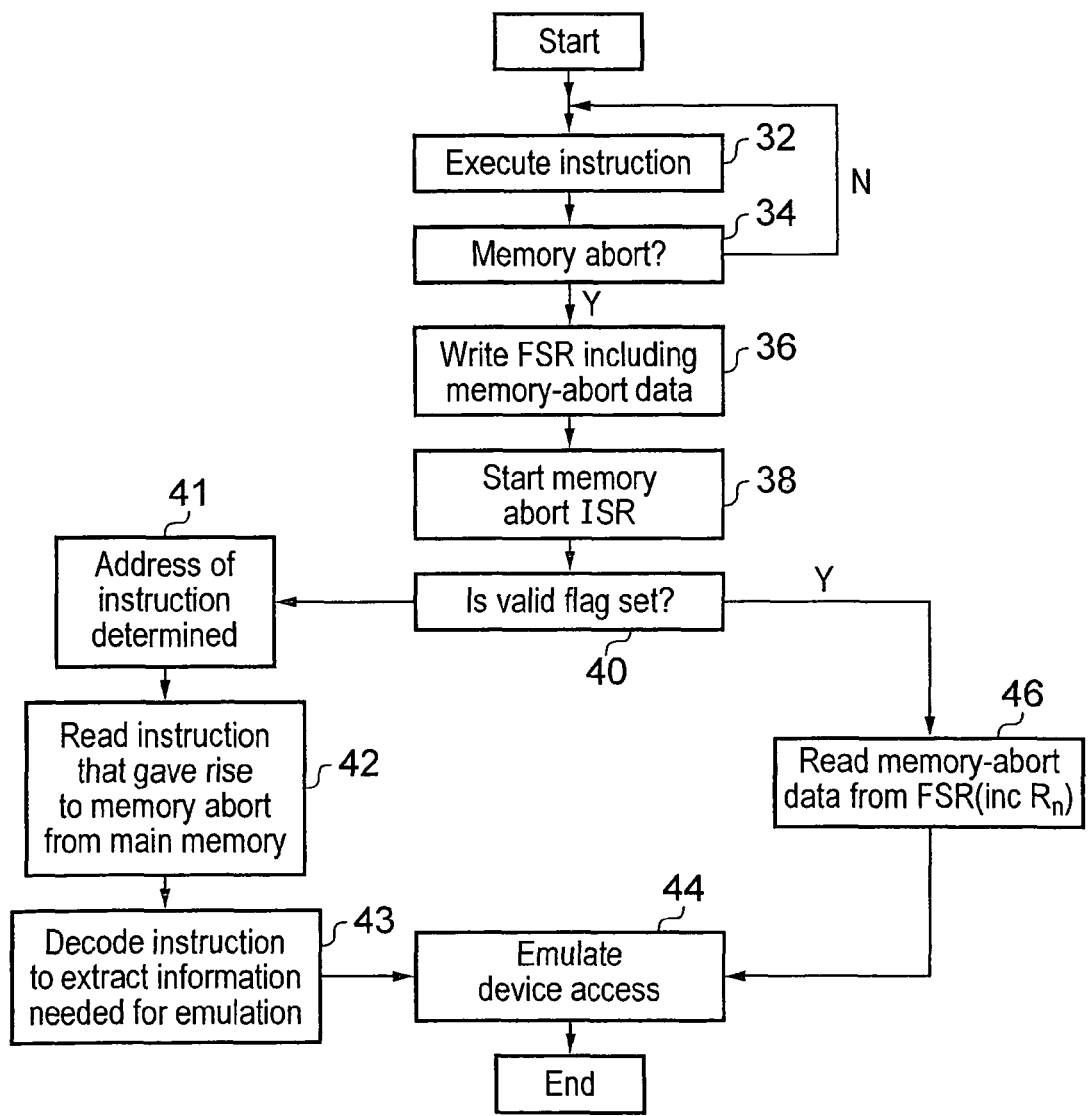
FIG. 4 is a flow diagram schematically illustrating techniques for supporting emulation of a memory access operation to a virtual memory-mapped device.

FIG. 4 is a flow diagram schematically illustrating the above techniques. At steps 32 and 34 the processor core 18 executes a stream of program instructions for emulating a program executing upon a virtual data processing apparatus 2 under control of a guest operating program 16, which is itself emulated (or supported) by a hypervisor program 14. When a memory abort occurs, processing proceeds to step 36. At step 36 the memory-abort data is written into the fault status register 28 by the processor core 18. Step 38 starts execution of an interrupt service routine which serves as the memory-abort handling program instructions which emulate the memory access to the virtual memory-mapped device. Step 40 determines whether the valid flag is set within the memory-abort data stored within the fault status register 28. If the valid flag is not set, then processing proceeds to step 41 where the address of the instruction which gave rise to the memory abort is determined and then to step 42 where the instruction which gave rise to the memory abort is read from the main memory 22 via multiple levels of address translation and possible cache misses as previously described. Step 43 then decodes the instruction read from memory and step 44 emulates the device access to the virtual memory-mapped device using the data derived from the reading of the program instruction at step 42.

If the valid flag indicates that the memory-abort data stored within the fault status register 28 is valid, then step 40 directs processing to step 46 where the memory-abort data is read from the fault status register 28 and used by step 44 to emulate the memory access to the virtual memory-mapped device. The memory-abort data includes data such as that illustrated in FIG. 3 including a source/destination register number, a data access size, instruction size, sign extension information, read/write information and abort type as well as optionally updated address information which may be stored within an update register 30 and separately read as part of the execution of the memory-abort handling program instructions. The completion of the emulation of the memory access to the virtual memory-mapped device will normally finish with a return to the execution of the program stream in which the memory-abort arose.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of supporting virtualisation of a virtual data processing apparatus with a host data processing apparatus, said method comprising the steps of:

executing a stream of program instructions with said host data processing apparatus to emulate processing by said virtual data processing apparatus;

detecting with detection circuitry an attempted execution of a memory accessing instruction seeking to perform a memory access operation upon a memory address corresponding to a memory mapped device of said virtual data processing apparatus;

writing with memory-abort circuitry to a memory-abort register memory-abort data characterising said memory access operation, said memory-abort data including data indicative of one or more registers accessed with said memory access operation; and triggering a memory-abort exception by execution of memory-abort handling program instructions by said host data processing apparatus to:

(i) read said memory-abort data from said memory-abort register;

(ii) emulate said memory access operation using said memory-abort data including said data indicative of one or more registers accessed with said memory access operation; and (iii) return to execution of said stream of program instructions, wherein said memory-abort data comprises validity data indicative of whether or not said memory-abort data is valid for said memory accessing instruction that triggered said memory abort exception and, if said memory-abort handling program instructions determine from said validity data that said data characterising said memory-abort is not valid for said memory-abort exception, then said memory-abort handling program instructions read said memory accessing instruction from an instruction memory and determine from said memory accessing instruction one or more parameters for emulating said memory access operation.

2. A method as claimed in claim 1, wherein said memory-abort data comprises one or more of:

data indicative of a size of a data word being subject to said memory access operation;

data of whether said memory access operation is a read operation or a write operation;

data indicative of one or more source registers for said memory access operation;

said data indicative of one or more destination registers for said memory access operation; and data indicative of whether a data word being subject to said memory access operation is to be sign extended; and data indicative of an instruction size of said memory accessing instruction.

3. A method as claimed in claim 1, wherein when said memory accessing instruction specifies a base register storing an address value indicative of said memory address and an update to be performed upon said address value associated with said execution of said memory access instruction, said memory-abort handling program instructions read said memory accessing instruction from an instruction memory and determine from said memory accessing instruction one or more parameters for performing said update upon said address value within said base register.

4. A method as claimed in claim 1, wherein said validity data indicates said data characterising said memory abort is not valid for memory accessing instructions that update said address value stored in said base register.

5. A method as claimed in claim 1, wherein when said memory accessing instruction specifies a base register storing an address value indicative of said memory address and an update to be performed upon said address value associated with said execution of said memory access instruction, said method further comprising writing with said memory-abort circuitry to an update register update data characterising said update to be performed upon said address value.

6. A method as claimed in claim 5, wherein said memory-abort handling program instructions read said update data from said update register one or more parameters for performing said update upon said address value within said base register.

7. A method as claimed in claim 1, wherein said stream of program instructions are executed under control of a guest operating system, execution of said guest operating system by said virtual data processing apparatus being emulated by said host data processing apparatus under control of a hypervisor program.

8. A method as claimed in claim 1, wherein said detection circuitry is a memory management unit using page table data to control access to memory addresses within said memory.

9. A method as claimed in claim 8, wherein said page table data marks said memory address corresponding to said memory mapped device with a value that triggers an abort when said memory accessing instruction seeks to perform said memory access operation.

10. Apparatus for processing data providing support for virtualisation of a virtual data processing apparatus, said apparatus for processing data comprising:
    detection circuitry responsive to an attempted execution of a memory accessing instruction seeking to perform a memory access operation upon a memory address corresponding to a memory mapped device of said virtual data processing apparatus to trigger a memory abort; and
    memory-abort circuitry responsive to said memory abort to write to a memory-abort register memory-abort data characterizing said memory access operation, said memory-abort data including data indicative of one or more registers accessed with said memory access operation, wherein said memory-abort data comprises validity data indicative of whether or not said memory-abort data is valid for said memory accessing instruction that triggered said memory abort exception, said memory abort is handled by memory-abort handling program instructions executed by said apparatus for processing data, and, if said memory-abort handling program instructions determine from said validity data that said data characterising said memory-abort is not valid for said memory-abort exception, then said memory-abort handling program instructions read said memory accessing instruction from an instruction memory and determine from said memory accessing instruction one or more parameters for emulating said memory access operation.

11. Apparatus as claimed in claim 10, wherein said memory-abort data comprises one or more of:
    data indicative of a size of a data word being subject to said memory access operation;
    data of whether said memory access operation is a read operation or a write operation;
    data indicative of one or more source registers for said memory access operation;
    data indicative of one or more registers accessed with said memory access operation; and
    data indicative of whether a data word being subject to said memory access operation is to be sign extended; and
    data indicative of an instruction size of said memory accessing instruction.

12. Apparatus as claimed in claim 10, wherein when said memory accessing instruction specifies a base register storing an address value indicative of said memory address and an update to be performed upon said address value associated with said execution of said memory access instruction, memory-abort handling program instructions read said memory accessing instruction from an instruction memory and determine from said memory accessing instruction one or more parameters for performing said update upon said address value within said base register.

13. Apparatus as claimed in claim 10, wherein said validity data indicates said data characterising said memory abort is not valid for memory accessing instructions that update said address value stored within said base register.

14. An apparatus as claimed in claim 10, wherein when said memory accessing instruction specifies a base register storing an address value indicative of said memory address and an update to be performed upon said address value associated with said execution of said memory access instruction, said memory-abort circuitry being responsive to said memory abort to write to an update register update data characterising said update to be performed upon said address value.

15. Apparatus as claimed in claim 14, wherein memory-abort handling program instructions read said update data from said update register one or more parameters for performing said update upon said address value within said base register.

16. Apparatus as claimed in claim 10, wherein a stream of program instructions are executed under control of a guest operating system, execution of said guest operating system by said virtual data processing apparatus being emulated by said apparatus for processing data under control of a hypervisor program.

17. Apparatus as claimed in claimed in claim 10, wherein said detection circuitry is a memory management unit using page table data to control access to memory addresses within said memory.

18. An apparatus as claimed in claim 17, wherein said page table data marks said memory address corresponding to said memory mapped device with a value that triggers an abort when said memory accessing instruction seeks to perform said memory access operation.

19. A method of supporting virtualisation of a virtual data processing apparatus with a host data processing apparatus, said method comprising the steps of:
    executing a stream of program instructions with said host data processing apparatus to emulate processing by said virtual data processing apparatus;
    detecting with detection circuitry an attempted execution of a memory accessing instruction seeking to perform a memory access operation upon a memory address corresponding to a memory mapped device of said virtual data processing apparatus;
    writing with memory-abort circuitry to a memory-abort register memory-abort data characterising said memory access operation, said memory-abort data including data indicative of one or more registers accessed with said memory access operation; and
    triggering a memory-abort exception by execution of memory-abort handling program instructions by said host data processing apparatus to:
    (i) read said memory-abort data from said memory-abort register;
    (ii) emulate said memory access operation using said memory-abort data including said data indicative of one or more registers accessed with said memory access operation; and
    (iii) return to execution of said stream of program instructions, wherein, when said memory accessing instruction specifies a base register storing an address value indicative of said memory address and an update to be performed upon said address value associated with said execution of said memory access instruction, said method further comprising writing with said memory-abort circuitry to an update register update data characterising said update to be performed upon said address value.

20. A method of supporting virtualisation of a virtual data processing apparatus with a host data processing apparatus, said method comprising the steps of:

executing a stream of program instructions with said host data processing apparatus to emulate processing by said virtual data processing apparatus;

detecting with detection circuitry an attempted execution of a memory accessing instruction seeking to perform a memory access operation upon a memory address corresponding to a memory mapped device of said virtual data processing apparatus;

writing with memory-abort circuitry to a memory-abort register memory-abort data characterising said memory access operation, said memory-abort data including data indicative of one or more registers accessed with said memory access operation; and triggering a memory-abort exception by execution of memory-abort handling program instructions by said host data processing apparatus to:

(i) read said memory-abort data from said memory-abort register;

(ii) emulate said memory access operation using said memory-abort data including said data indicative of one or more registers accessed with said memory access operation; and (iii) return to execution of said stream of program instructions, wherein said detection circuitry is a memory management unit using page table data to control access to memory addresses within said memory, wherein said page table data marks said memory address corresponding to said memory mapped device with a value that triggers an abort when said memory accessing instruction seeks to perform said memory access operation.

21. Apparatus for processing data providing support for virtualisation of a virtual data processing apparatus, said apparatus for processing data comprising:

detection circuitry responsive to an attempted execution of a memory accessing instruction seeking to perform a memory access operation upon a memory address corresponding to a memory mapped device of said virtual data processing apparatus to trigger a memory abort; and memory-abort circuitry responsive to said memory abort to write to a memory-abort register memory-abort data characterizing said memory access operation, said memory-abort data including data indicative of one or more registers accessed with said memory access operation, wherein when said memory accessing instruction specifies a base register storing an address value indicative of said memory address and an update to be performed upon said address value associated with said execution of said memory access instruction, memory-abort handling program instructions read said memory accessing instruction from an instruction memory and determine from said memory accessing instruction one or more parameters for performing said update upon said address value within said base register.

22. Apparatus for processing data providing support for virtualisation of a virtual data processing apparatus, said apparatus for processing data comprising:

detection circuitry responsive to an attempted execution of a memory accessing instruction seeking to perform a memory access operation upon a memory address corresponding to a memory mapped device of said virtual data processing apparatus to trigger a memory abort; and memory-abort circuitry responsive to said memory abort to write to a memory-abort register memory-abort data characterizing said memory access operation, said memory-abort data including data indicative of one or more registers accessed with said memory access operation, wherein said detection circuitry is a memory management unit using page table data to control access to memory addresses within said memory, wherein said page table data marks said memory address corresponding to said memory mapped device with a value that triggers an abort when said memory accessing instruction seeks to perform said memory access operation.

* * * * *